United States Patent [19]

Burger

[11] 4,245,812

[45] Jan. 20, 1981

[54] DISPENSER FOR PRESSURIZED FLUID

[75] Inventor: Robert Burger, Wellesley Hills, Mass.

[73] Assignee: Loctite Corporation, Newington, Conn.

[21] Appl. No.: 930,955

[22] Filed: Aug. 4, 1978

[51] Int. Cl.³ .............................................. F16K 7/06
[52] U.S. Cl. ...................................... 251/10; 239/569
[58] Field of Search ..................... 251/9, 10; 222/506, 222/529; 24/134 R, 134 N, 134 KB, 248 E; 239/569

[56] References Cited

U.S. PATENT DOCUMENTS

| 902,942 | 11/1908 | Craig | 251/10 X |
|---|---|---|---|
| 2,858,095 | 10/1958 | Harris et al. | 251/9 |
| 2,998,956 | 9/1961 | Etten | 251/10 |
| 3,970,225 | 7/1976 | Jeal et al. | 251/9 X |

Primary Examiner—Martin P. Schwadron
Assistant Examiner—Richard Gerard
Attorney, Agent, or Firm—Eugene F. Miller

[57] ABSTRACT

A simplified device which dispenses accurate amounts of pressurized fluid, such as a liquid adhesive, upon application of force, e.g., finger pressure, upon a lever means which causes at least partial release of clamp pressure upon a tube carrying the fluid.

1 Claim, 5 Drawing Figures

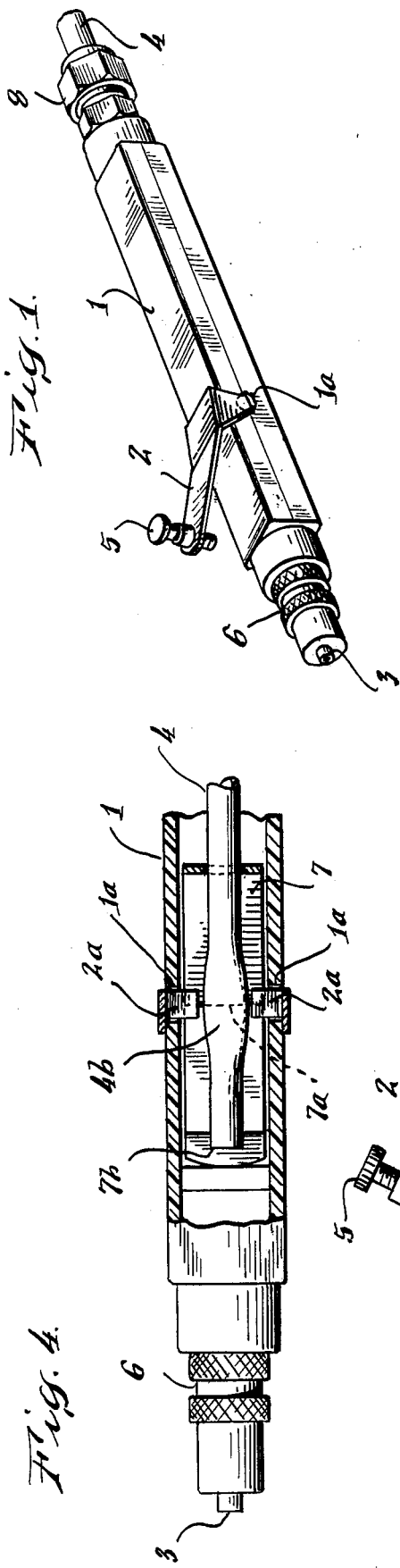
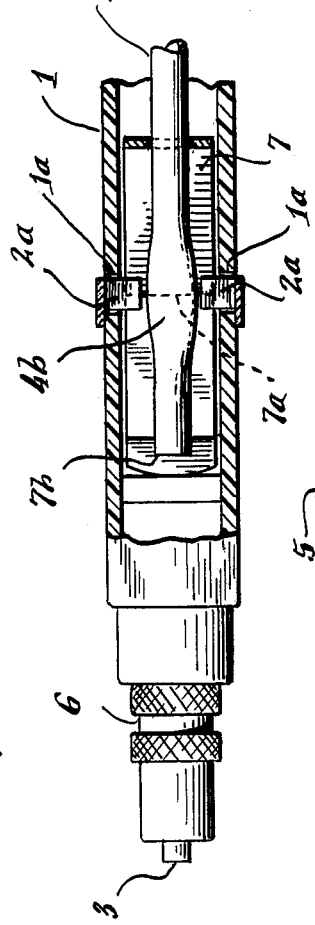
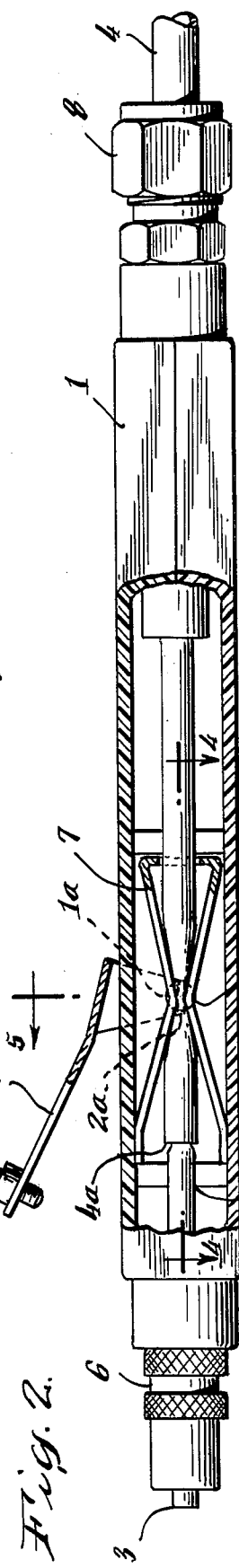
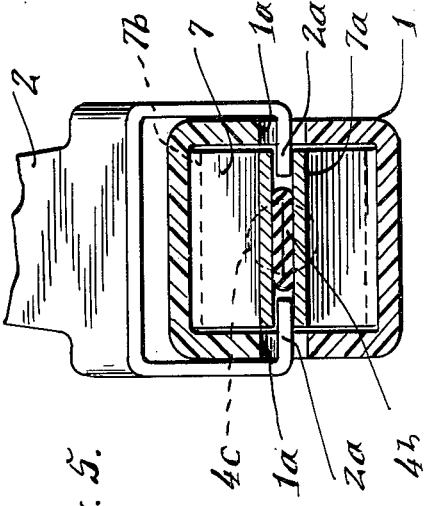
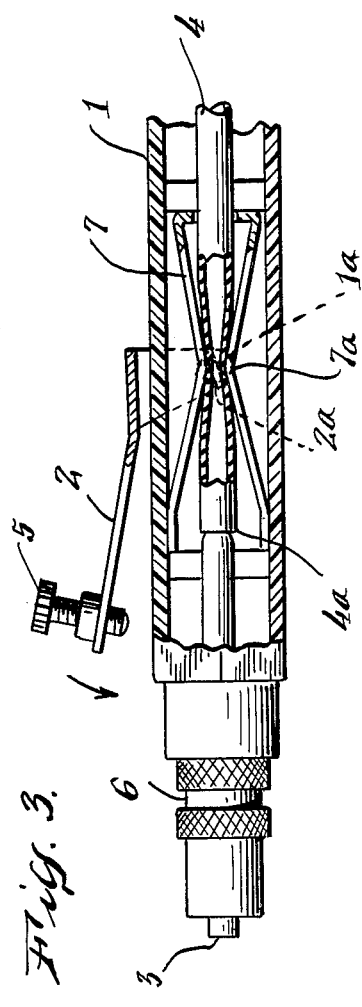

DISPENSER FOR PRESSURIZED FLUID

BACKGROUND OF THE INVENTION

This invention relates to devices which dispense accurate amounts of fluid upon demand, particularly where the fluid is supplied from a pressure-reservoir.

Adhesives have become increasingly popular in various industries as replacements for mechanical fasteners, and seals. In the majority of applications, it is critical that the amounts and drop sizes of the adhesives be accurately metered and placed for maximum effect. In some instances, the adhesives are supplied from a pressure reservoir, and are fed through a tube from the reservoir to a dispenser having some sort of valving, which is used to place the adhesive on the work surface. A typical valve release is actuated by a series of interconnections which respond to the ultimate stimulus, for example, manual touch or electrical signal. The difficulty here is the number of parts involved in producing a drop or a line of adhesive; and more parts, the greater likelihood of gradual inaccuracies occurring during use due to wearing out of parts. Although the foregoing emphasizes adhesives, it is obvious that it is equally true of any system which applies accurate amounts of a liquid onto a work surface, such as lubricating fluids.

SUMMARY OF THE INVENTION

It is thus a principal object of this invention to provide a fluid dispenser of simpler, less costly design, which will consistently and accurately meter and dispense fluids onto work surfaces. A corollary result will be a more direct and instant response to the actuating demand for fluid.

The present device has been invented to fulfill these needs, and possesses in preferred form only two moving parts, a lever means which opens a pinch clamp, obstructing the flow of pressurized fluid.

The following drawings illustrate a preferred embodiment of the device:

FIG. 1 is a front-and-side perspective of the housing and exterior;

FIG. 2 is a side elevational with most of the housing broken away;

FIG. 3 is the same as FIG. 2 with the device shown in its operational mode;

FIG. 4 is a top plan view along section 4—4 of FIG. 2; and

FIG. 5 is a rear elevational along section 5—5 of FIG. 2.

DESCRIPTION OF THE INVENTION

An overview of the device can be seen in FIG. 1, comprised of an external housing 1; a side opening 1a therein for receiving an edge or tab of a lever means 2; a corresponding opening on the other side, not seen; a nozzle head assembly 6 supporting nozzle 3; an end portion of a liquid-conveying tube 4 is carried within the housing and is, of course, internally connected to the nozzle; and an adjustable screw 5 is present on the tip of the lever means 2 so that the maximum movement of the lever means toward the housing can be limited as desired.

The device is designed to be used either manually, held as one would a pencil, activated by finger pressure on the lever means 2, or automatically, where, for example, the lever means would be depressed by an automated pressure stroke means as part of a larger apparatus. The lever means can be any configuration so long as movement of it from its rest, or neutral position, produces the camming effect on the pinch clamp to be described. There is deemed to be no criticality with respect to the specific size, geometry or materials of construction of the housing, or of the nozzle and head assembly, apart from the basic ability of the device to dispense accurate amounts of fluid on a work surface.

The interior of the device is seen by referring to FIG. 2. A pinch clamp 7 is fitted within the housing 1 and converges by construction at a clamping, or pressure, point 7a. The clamp shown is in a preferred figure-8 shape, but any style of clamp is acceptable so long as the pressure point is capable of being opened by the lever means as described below. The clamp is preferably secured in the housing by suitable stops and prevented from moving toward the front or back of the housing. Preferably the housing abutts the clamp in such a way as to force the clamps closed at the pressure point; however, a clamp may be used which inherently is biased to be firmly closed at the pressure point.

An end portion of a fluid-carrying tube 4 is contained in the housing 1, entering through rear assembly 8, passing through, and being clamped by, the pinch clamp at the pressure point 7a and opening 7b in the clamp brace, and connecting with the nozzle at 4a.

The sides of the lever means 2, shown by dashed lines in FIG. 2, have curved tabs 2a which enter suitably shaped openings 1a, for example, circular, in the housing 1. As seen in FIG. 5, lever tabs 2a are effectively fixed by, and pivotally mounted in the housing thereby. Most important, tabs 2a are placed between the clamping edges 7a of the clamp 7.

When the lever means 2 is in the rest, or neutral position, as seen in FIGS. 2, 4 and 5, the clamp forces the tube closed 4b, relative to its normal diameter, dashed in at 4c. The lever means tabs 2a are held essentially horizontal by the constraining effects of openings 1a and the pressure points 7a of the pinch clamp 7. FIG. 3 illustrates the operation of the device in the dispensing of fluid. Lever means 2 is depressed, which pivots tabs 2a and forces, via a cam action, the clamping edges of clamp 7 apart at the pressure point 7a. The tube is allowed to expand correspondingly and pressurized fluid would then, of course, flow through the device and out through nozzle 3. When the force is removed from the lever means, the natural spring action of the clamp squeezes the tube closed again and also returns the lever means to its rest position by exerting force on tabs 2a.

The exact degree of opening permitted will be dependant upon the dimensions of a specific device and the amount of fluid desired to be dispensed. As before stated, a control means, such as adjustable screw 5, may be designed into the device to control the degree to which the lever means may be pivoted, and therefore control the fluid flow during operation. It should be understood that tabs 2a which produce the camming effect on the clamp need not be unitary with the lever means 2, but may simply be connected, or adjacent, thereto so long as downward movement of the lever means causes a prying movement of the tabs 2a at the pressure point 7a of the clamp.

It is readily apparent from the above description and the drawings of the present invention that a fluid-dispensing device has been designed which reduces the number of moving parts to a minimum, which can be assembled at nominal cost, and which is extremely responsive. It will be obvious to those skilled in the art that numerous alternate designs may be arrived at without departing from the scope of the present invention.

What is claimed is:

1. A device for dispensing fluid on demand, which comprises:
   (a) an elongated housing for containing an end portion of a flexible fluid-conveying tube, and having a first opening at one end for receiving the tube, and a second opening at the opposite end for discharging the fluid;
   (b) a flexible pinch clamp fitted within the housing through which a flexible tube may pass and be clamped shut thereby, wherein said pinch clamp possesses clamping edges biased toward a closed position upon each other;
   (c) lever means outside of the housing, pivotally mounted through the sides thereof;
   (d) at least one tab between the clamping edges of the pinch clamp, said tab connected to, or part of, said lever means;

said device adapted such that application of pressure on the lever means causing movement of same toward the housing pivots the tab and forces the clamping edges apart, and upon release of the pressure, the clamping edges close back upon each other.

* * * * *